United States Patent [19]

Ueyoko et al.

[11] Patent Number: 5,285,835
[45] Date of Patent: * Feb. 15, 1994

[54] HIGH SPEED RADIAL TIRE WITH DURABLE BEAD PART

[75] Inventors: Kiyoshi Ueyoko, Osaka; Tsuneyuki Nakagawa, Kobe; Mikio Takatsu, Takarazuka; Hiroyuki Noma, Kobe; Yoshihide Kojima, Takarazuka, all of Japan

[73] Assignee: Sumitomo Rubber Industries, Ltd., Kobe, Japan

[*] Notice: The portion of the term of this patent subsequent to Feb. 4, 2009 has been disclaimed.

[21] Appl. No.: 794,646

[22] Filed: Nov. 18, 1991

Related U.S. Application Data

[63] Continuation of Ser. No. 403,311, Sep. 6, 1989, abandoned.

[30] Foreign Application Priority Data

Sep. 6, 1988 [JP] Japan .................. 63-223941

[51] Int. Cl.$^5$ ............ B60C 3/00; B60C 9/00; B60C 9/08; B60C 11/00
[52] U.S. Cl. .............. 152/209 R; 152/451; 152/454; 152/539; 152/556
[58] Field of Search ........... 152/454, 209 R, 539, 152/556, 451

[56] References Cited

U.S. PATENT DOCUMENTS

| | | | |
|---|---|---|---|
| 3,455,100 | 7/1969 | Sidles et al. | 152/556 X |
| 4,214,620 | 7/1980 | Mezzanotte | 152/454 X |
| 4,269,646 | 5/1981 | Miller et al. | 152/454 X |
| 4,271,890 | 6/1981 | Pommier | 152/454 |
| 4,342,353 | 8/1982 | Tamura et al. | |
| 4,520,856 | 6/1985 | Pommier | 152/454 |
| 4,751,952 | 6/1988 | Imai | 152/527 |
| 4,932,452 | 6/1990 | Kawabata et al. | 152/454 |

FOREIGN PATENT DOCUMENTS

| | | | |
|---|---|---|---|
| 0321730 | 6/1989 | European Pat. Off. | |
| 0323208 | 7/1989 | European Pat. Off. | |
| 0339872 | 11/1989 | European Pat. Off. | 152/454 |
| 58-211902 | 12/1983 | Japan | |
| 62-152902 | 7/1987 | Japan | 152/454 |
| 1-175510 | 7/1989 | Japan | 152/539 |
| 2092964 | 8/1982 | United Kingdom | |

Primary Examiner—Michael W. Ball
Assistant Examiner—Adrienne C. Johnstone

[57] ABSTRACT

This invention relates to high-speed radial tires, and more particularly to radial tires wherein the thickness ratio (Gc−Gs)/Gc, that is the ratio of the difference between the crown tread thickness Gc, which is a thickness of the tread on the equator of the tire, and the shoulder tread thickness Gs, which is a thickness of the tread of the ground contact surface at the outer edge in direction of the tire axis, to the crown tread thickness Gc is set to be 0 or more and 0.8 or less. By setting the ratio within a range of 0 to 0.8, the force Fs acting in the radial direction on the tread shoulder part, out of the total load acting to the tire, is decreased, thus, the deformation in the bead part is diminished and the permanence in the bead part can be improved. In a tire having the ratio of 0 to 0.8, by setting the angle of the belt cords to be 0 to 20 degrees, it can be used for aircraft and by setting the angle of the belt cords to be 20 to 40 degrees and the aspect ratio to be 60% or less, it can be used for high-speed passenger cars.

1 Claim, 6 Drawing Sheets

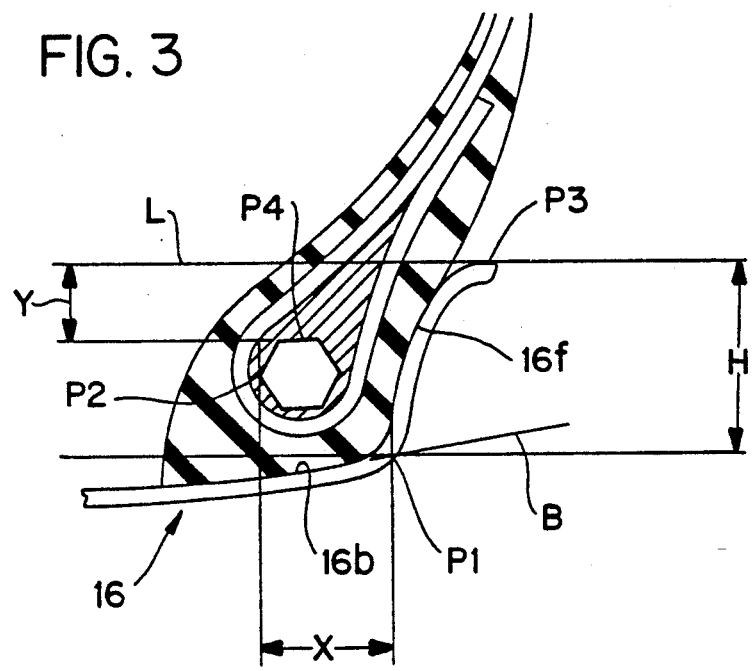
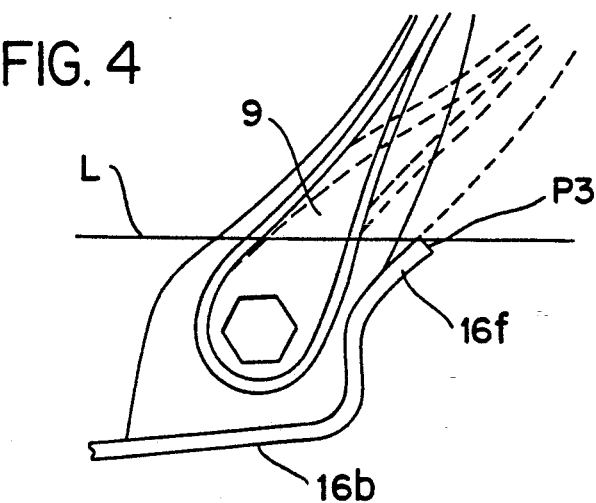

HIGH SPEED RADIAL TIRE WITH DURABLE BEAD PART

This application is a continuation of application Ser. No. 07/403,311 filed on Sep. 6, 1989, now abandoned.

BACKGROUND OF THE INVENTION

The present invention relates to a high-speed radial tire which can improve the permanence of the bead part of the tire and can be used for aircraft and high-speed passenger cars.

In high-speed radial tires such as those for aircraft and for high-speed passenger cars which can run at a high speed exceeding 300 km per hour, recently high-speed radial tires having a belt layer composed of highly elastic belt cords placed outside in the radial direction of carcass of a radial structure in which carcass cords are aligned in the radial direction of a tire have been used.

Since such a tire having a radial structure is constructed with a rigid belt layer, for example, the side-wall part and the bead part deform significantly. Especially due to the construction of a bead apex made of rubber which has a relatively large hardness and generates much heat due to deformation, the bead part develops a high temperature by the heat which is generated from repeated deformations caused by the rolling of the tire. Since it is thicker and since the winding-up portion of the carcass and reinforcement layers are concentrated there, an interlayer shearing strain is generated due to bending deformations, which leads to tire damage.

In the bead part, compression by bending and folding on the rim flange upon loading generates a large compression stress in carcass cords of the bead part, and by repetition of the compression stress, a breakage of the carcass cords and a concentration of stresses generated at the broken edges lower the strength of the carcass cords and the rubber itself, which leads to the damage of the bead part.

Therefore, in order to prevent damage of the bead part, it is preliminarily required to decrease the deformation of the bead.

On the other hand, as shown in FIG. 10, deformation of the bead part is generated by a bending moment M2 which is created by a radial force Fs, which acts on the shoulder part of the tread, acting on the bead part through a bending moment M1 created at the side-wall part of the tread.

Therefore, in order to diminish the bending moment M2 to consequently diminish the deformations of the bead part, it may be considered to increase the internal pressure of the tire, to decrease the rigidity of the side-wall part and to diminish the force Fs which acts on the shoulder part.

However, if the rigidity of the side-wall part is reduced to diminish the bending moment M2 acting on the bead part, the transversal rigidity and the strength of the tire tend to decrease consequently. If the internal pressure is increased, the performance of the tire decreases due to an increased bounce and the balance of the tire becomes worse, which leads rather to shortening of its life.

On the other hand, in a conventional tire, as shown in FIG. 10, the thickness of the shoulder part of the tread Gs has been set to be larger compared with the thickness of the tread part Gc on the equator of the tire CO.

As a result, the bending rigidity at the shoulder part becomes larger, which increases, out of the total force F of the ground contact pressure distribution at the ground contact surface, the force Fs acting on the shoulder part relatively, the bending moment M1 and then the bending moment M2.

From this point of view, finding that, in order to decrease the force Fs acting on the shoulder part, by increasing the force Fc at the crown part, out of the load of tire F which is the total force at the ground contact surface, the force Fs at the shoulder part can be relatively decreased. The present inventors have developed this invention. Thus, it is a primary object of the present invention to present a novel high-speed radial tire which can decrease the force Fs acting on the shoulder part and diminish the deformations at the bead part, and hence improve the durability of the bead part.

SUMMARY OF THE INVENTION

According to one aspect of the present invention, a high-speed radial tire, which is used for aircraft, comprises a carcass having a radial construction composed of at least one ply of carcass cords aligned at an inclination of 70 to 90 degrees against the equator of a tire and fixed by folding over both ends around the bead cores of right and left beads, and a belt layer, wherein the thickness ratio $(Gc-Gs)/Gc$, that is, the ratio of the difference between the crown tread thickness Gc, which is a thickness of the tread on the equator of the tire, and the shoulder thead thickness Gs, which is a thickness of the tread of the ground contact surface at the outer edge in the direction of the tire axis, at a position where the ground contact surface in direction of the tire axis is of the widest width, when mounted on a regular rim, inflated with a specified internal pressure and loaded with a specified load, $Gc-Gs$, to the crown thead thickness Gc is 0 or more and 0.8 or less, and the belt layer comprises a plurality of plies of belt cords superposed at an inclination of 0 to 20 degrees against the equator of the tire.

Further, according to a second aspect of the present invention, a high-speed radial tire, which is mainly used for high-speed passenger cars running at a speed exceeding 300 km per hour, comprises a carcass having a radial construction composed of at least one ply of carcass cords aligned at an inclination of 70 to 90 degrees against the equator of a tire and fixed by folding over both ends around the bead cores of right and left beads, and a belt layer, wherein the thickness ratio $(Gc-Gs)/Gc$, that is, the ratio of the difference between the crown tread thickness Gc, which is a thickness of the tread on the equator of the tire, and the shoulder tread thickness Gs, which is a thickness of the tread of the ground contact surface at the outer edge in the direction of the tire axis, at a position where the ground contact surface in direction of the tire axis is of the widest width, when mounted on a regular rim, inflated with a specified internal pressure and loaded with a specified load, $Gc-Gs$, to the crown tread thickness Gc is 0 or more and 0.8 or less, and the belt layer comprises a plurality of plies of metallic belt cords superposed at an inclination of 20 to 40 degrees against the equator of the tire and the aspect ratio is 60% or less. Thus, the first and second aspects of the present invention are common in the main constructive factors on the crown tread thickness Gc and the shoulder tread thickness Gs, and according to the different inclination angles of the belt cords, the tires can be used for aircraft and high-speed passenger cars, respectively.

By setting the thickness ratio $(Gc-Gs)/Gc$ to be 0 or more, the shoulder tread thickness Gs of the ground contact surface at the widest ground contact surface position becomes equal to or less than the crown tread thickness Gc, which reduces the rigidity in the part, and the force Fc in the crown part in the radial direction relatively increases, and as a result, the force Fs acting on the shoulder part in the radial direction is decreased.

By setting the ratio $(Gc-Gs)/Gc$ to be less than 0.8, the shoulder tread thickness Gs becomes excessively smaller compared with the crown tread thickness Gc, which prevents the strength and the wear resistance in the part from decreasing.

Therefore, by setting the ratio $(Gc-Gs)/Gc$ to be within the range, the force Fs acting in radial direction on the widest ground contact surface position of the ground contact surface S can be reduced without impairing the durability of the shoulder part, and, thus, by decreasing the bending moment M2 acting on the bead part and diminishing the deformation in the bead part, the damages in the bead part can be prevented.

Moreover, in the first feature of the present invention, by forming the belt layer with a plurality of plies inclined by 0 to 20 degrees against the equator of the tire, the hoop effect of the belt increases and inflation with high internal pressure becomes possible, which makes the tire usable for aircraft.

In a second feature of the present invention, by using metallic belt cords for the belt layer and a plurality of plies of the cords inclined by 20 to 40 degrees against the equator of the tire, the belt layer can be formed in a triangular construction, whereby its rigidity increases, the rolling resistance and wearing decreases, and the turning stability increases, which makes the tire usable for high-speed passenger cars especially with a depression ratio of 60% or less and a running speed exceeding 300 km per hour.

BRIEF DESCRIPTION OF THE DRAWINGS

Referring now to the drawings, one of the embodiments of the present invention is described in details below, taking, as an example, a tire for aircraft measuring 46×17R20, in the drawings;

FIG. 3 is a sectional view showing a bead part, FIG. 4 is a sectional view showing a bead part.

DETAILED DESCRIPTION OF THE INVENTION

Figure 1:
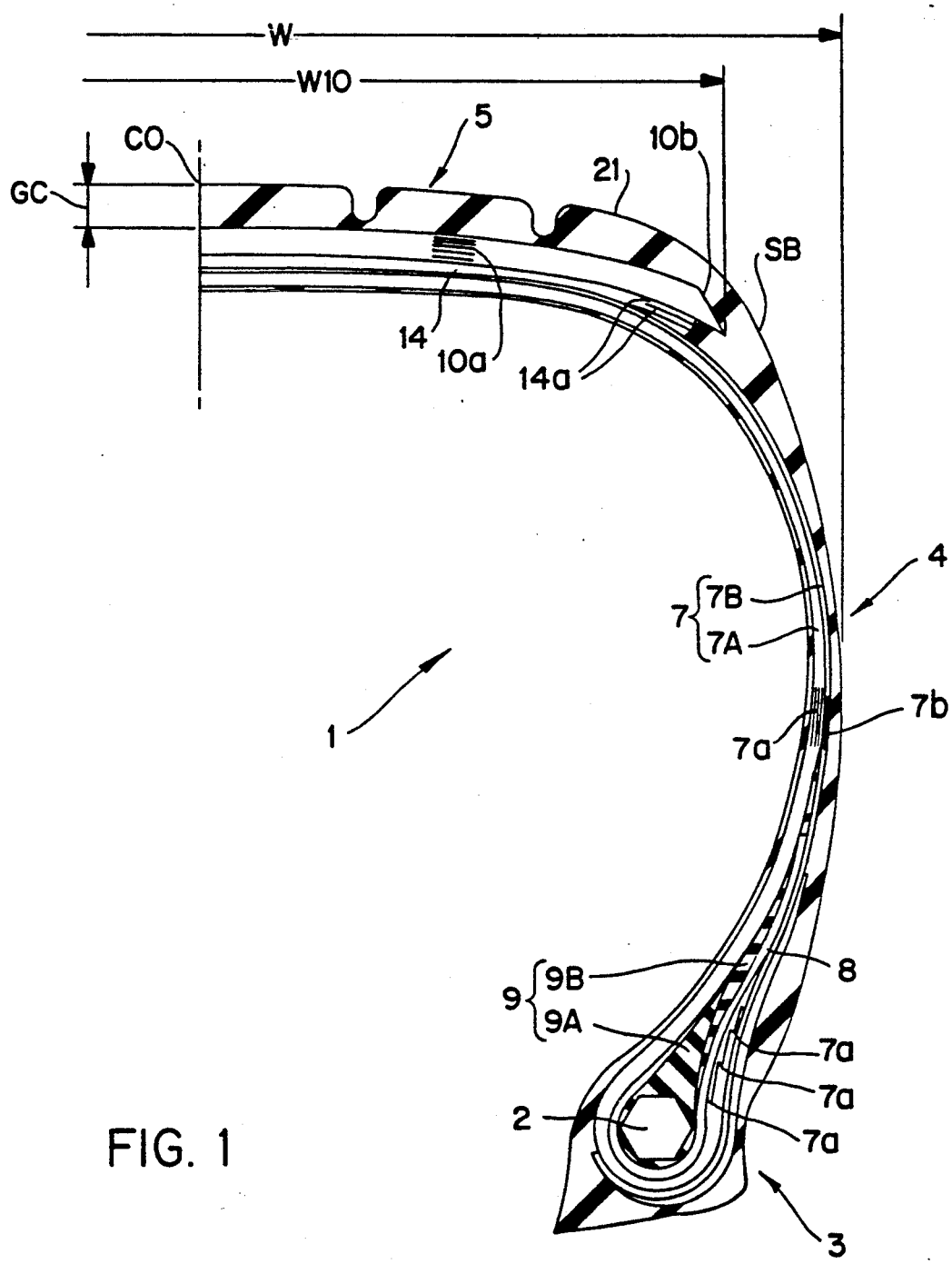
FIG. 1 is a sectional view showing one of the embodiments of the first invention.

In FIG. 1 which shows a tire state inflated with a specified internal pressure, a high-speed radial tire 1 comprises a bead part 3 with a bead core 2 passing through it, a side-wall part 4 connecting to the bead part 3 and extending outward in the radial direction of the tire and a tread part 5 combining the outer ends of the side-wall part 4.

In addition, the tire 1 has a carcass 7 comprising an inner layer 7A composed of plural, for example, four carcass plies 7a . . . which fold around the bead core 2 from the inside to the outside of the tire and an outer layer 7B composed of plural, for example, two carcass plies 7b and 7b which enclose the inner layer 7A and fold it from the outside to the inside of the tire. Each carcass cord of the carcass plies 7a and 7b is positioned in the radial direction having an inclination of 70 to 90 degrees against the equator of the tire and in the carcass 7 of this embodiment, between the adjoining carcass plies, each carcass cord is mutually crossed and inclined in the radial direction of the tire.

In the inner surface of the carcass 7, a covered layer 8 is constructed, which prevents abrasion of the carcass 7 caused by cyclic moment drawn around the bead core 2 according to the repeated deformations of the tire, and above the bead core 2 is constructed a bead apex 9 comprising a tapered rubber and extending over the upper end of the covered layer 8, thus increasing the rigidity and dispersing stresses by the deflection of the fold-over part of the carcass. The bead apex 9 comprises an upper part 9A made of a hard rubber and a lower part 9B made of a soft rubber, and in the outer surface of the bead part 3, a chafer (not shown), which prevents the rim from shearing, can also be constructed.

Inside the tread part 5, a belt layer 10 is constructed outside the carcass 7 in the radial direction, and in this embodiment, between the belt layer 10 and the carcass 7, there exists a cut breaker 14.

Furthermore, the belt layer 10 comprises plural, for example, six to ten belt plies 10a . . ., and since the belt plies 10a . . . are gradually reduced in width in the outward radial direction, the belt layer 10 forms a trapezoid in the section which includes the tire axis, and its side surface 10b is inclined nearly along the outer surface SB of a tire buttress part. The widest width W10 of the belt layer, i.e. the width of the inner ply 10a in the embodiment, is set to be within a range of 75 to 85% of the overall tire width W.

Figure 2A:
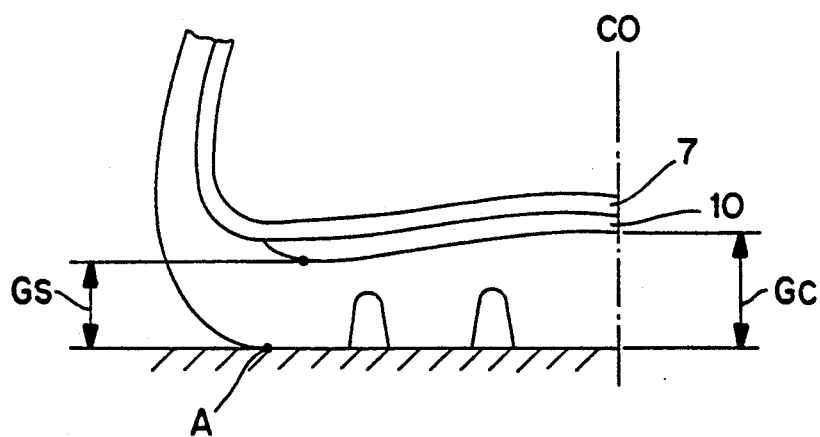
FIGS. 2(a) and 2(b) are sectional views showing a ground state and a ground contact surface, respectively.
Figure 2B:
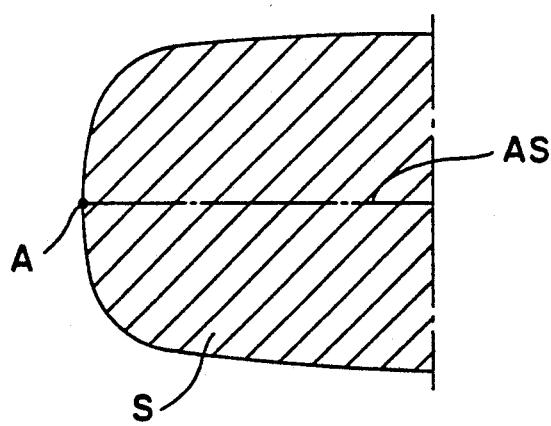

As shown in FIG. 2, the thickness ratio $(Gc-Gs)/Gc$, that is, the ratio of the difference between the crown tread thickness Gc, which is a thickness of the tread 5 on the equator CO of the tire, and the shoulder tread thickness Gs, which is a thickness of the tread 5 of the ground contact surface S at the outer edge A in the direction of the tire axis at the position AS where the ground contact surface S in direction of the tire axis is of the widest width when mounted on a regular rim, inflated with a specified internal pressure and loaded with a specified load, Gc−Gs, to the crown tread thickness Gs is set to be 0 or more and 0.8 or less.

The shoulder tread thickness Gs is defined as the distance in the radial direction from the outer edge A of the ground contact surface S to the side edge of the belt layer 10.

Thus, by setting the thickness ratio $(Gc-Gs)/Gc$ to be 0 or more, the shoulder tread thickness Gs becomes equal to or less than the crown tread thickness Gc, which reduces the rigidity in this portion and relatively increases the force Fc in the radial direction in a crown part 20, and as a result, the force Fs in the shoulder part acting in the radial direction, especially to the outer edge A of the ground contact surface S is reduced.

Furthermore, by setting the thickness ratio (Gc−Gs)/Gc to be 0.8 or less, the shoulder tread thickness Gs becomes excessively small compared with the crown tread thickness Gc, which prevents the strength and the wear resistance in this portion from decreasing.

Therefore, by setting the ratio (Gc−Gs)/Gc to be within this range, the force Fs acting in the radial direction, especially on the outer edge A of the widest ground contact surface position AS of the ground contact surface S, can be decreased without impairing the durability of the shoulder part, which decreases the bending moment M2 acting on the bead part 3, diminishes the deformations in the bead part and, as a result, prevents the bead part from being damaged.

The more preferable thickness ratio (Gc−Gs)/Gc for that purpose is 0 or more and 0.5 or less, and still more preferably, it is more than 0 to 0.3 or less.

The width of the cut breaker 14 can be larger or smaller than the tread width W10.

In the bead core 2, as shown in details in FIG. 3, the ratio X/H of a distance X, which is from the bead heel point P1, a supposed intersection point of an extension of a rim base 16$b$ of a rim 16, i.e. a bead base line B and an extension of the inner surface of a rim flange 16$f$ to the inward end P2 in the tire axis direction of the bead core 2, to the height H of a rim flange 16$f$, which is a distance from the bead heel point P1 in the radial direction to the upper end P3 of the rim flange 16$f$, is 0.8 or more and 1.05 or less.

The outward end P4 in the radial direction of the bead core 2 is positioned inside in the radial direction of the line L drawn in the direction of the tire axis via the upper end P3 of the rim flange 16$f$, and the ratio Y/H of a distance Y in the radial direction from the line L to the outward end P4 to the height H is 0 or more and 0.3 or less.

In a radial tire for aircraft, when receiving a load, in the bead part 3 in the section which includes the tire axis, as shown by dotted lines in FIG. 4, a bending deformation is created outside in the radial direction of the line L drawn in the direction of the tire axis at the upper end P3 of the rim flange 16$f$, and by repetition of the deformations, especially the bead apex 9 generates heat. Therefore, by priorly forming a shape of the bead apex 9 close to a deformed shape by loading, the deformation and the generation of heat of the bead apex 9 due to loading can be diminished.

The bead apex 9, as already described, has a tapered sectional shape, and the shape of its base part, where the deformation and the generation of heat due to loading are the problems, is mostly determined according to the relative positioning of the bead core 2 and the rim 16. Therefore, by setting the ratios on the bead core 2, X/H and Y/H, within said ranges, the shape of a bead apex 9 which can restrain the deformation and the generation of heat can be obtained.

The ratio X/H for this purpose is 0.80 or more, preferably 0.85 or more, and if it is less than 0.80, it can not achieve the purpose. If the ratio X/H exceeds 1.05, the volume of the bead part 3 becomes too large, and the bead core 2 is too distant from the rim flange 16$f$, which adversely affects the durability and the fitting of the rim, as well as making the production difficult. More preferably the ratio X/H is 1.0 or less.

If the ratio Y/H exceeds 0.30, the purpose can not be achieved, and if it is less than 0 where the outward end P4 in the radial direction of the bead core 2 is positioned outside in the radial direction of the line L, the flexing of the carcass 7 concentrates around the outward end P4 in the radial direction of the bead core 2, which destroys the carcass 7 itself.

Thus, by diminishing the deformation of the bead apex 9 upon loading, the generation of heat in the bead apex 9, where it is generally inevitable to adopt a high heat generating rubber, can be decreased, and it restrains the temperature increase of the bead part 3 while running as well as diminishing the shearing strain created at the winding part of the carcass 7 and in the reinforcement layers, which improves the constructive permanence of the bead part.

In this embodiment, for carcass cords, elastic cords having high stretchability are used as well as for belt cords forming the belt ply 10$a$.

Figure 5:
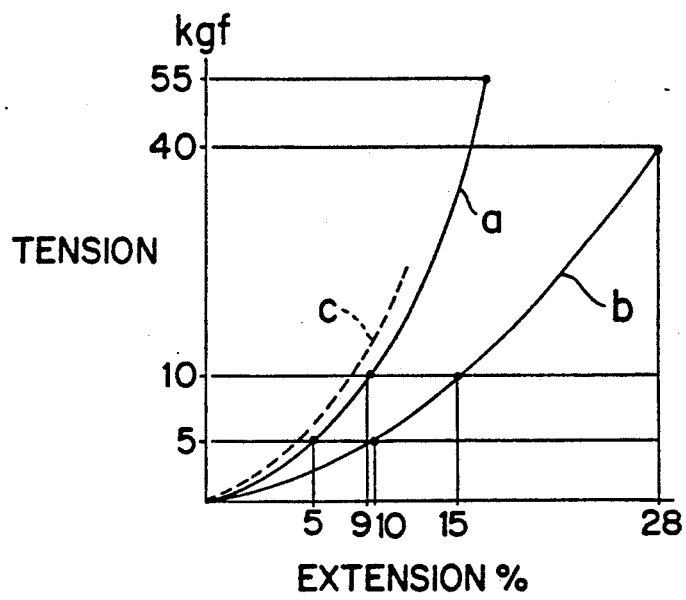
FIG. 5 is a perspective view showing an example of a belt cord extension.
Figure 6:
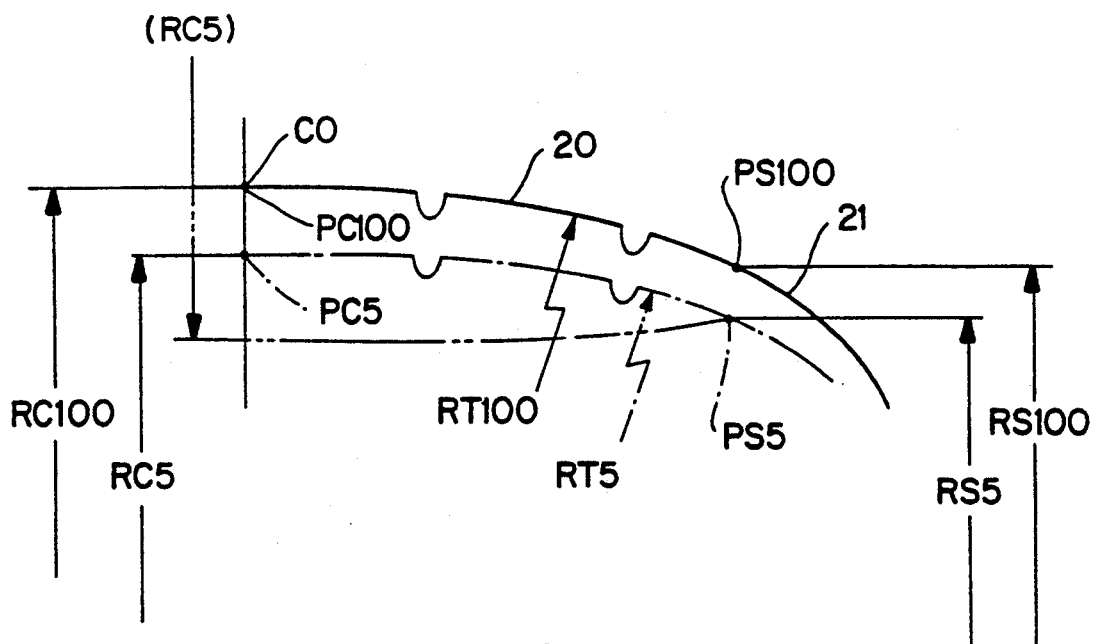
FIG. 6 is a diagram showing an example of the expansion of the tread surface due to inflation with an internal pressure.
Figure 7:
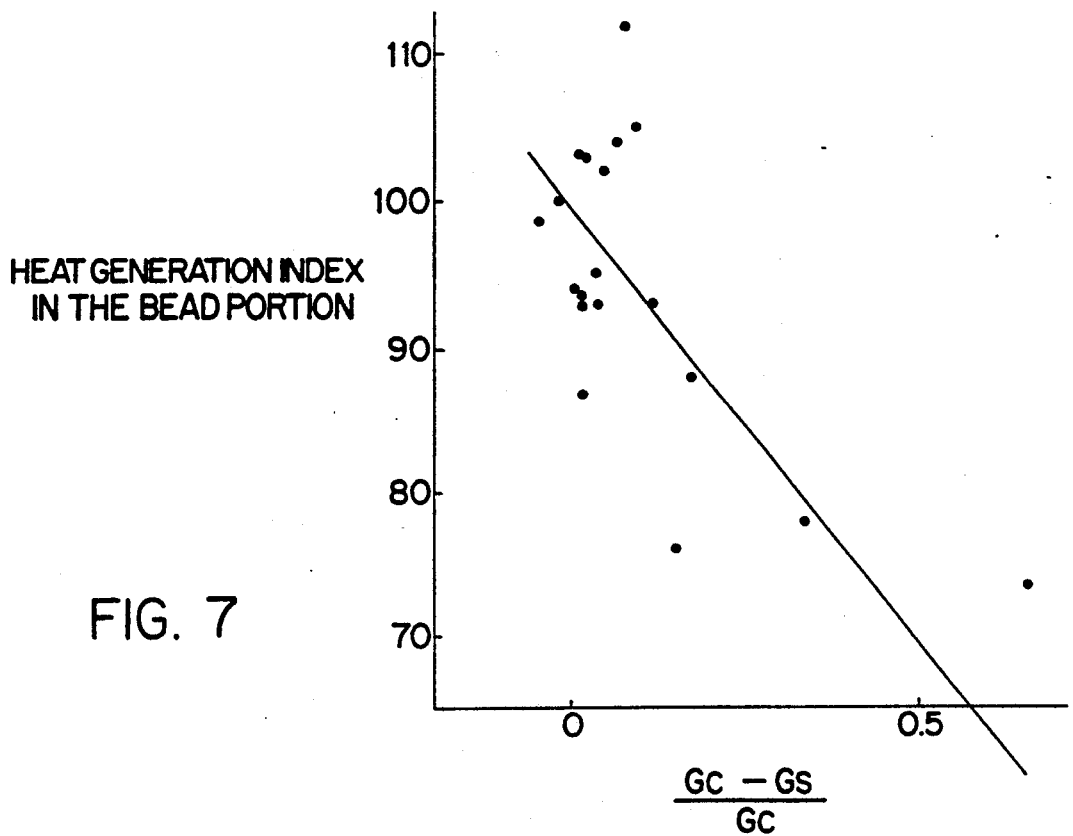
FIG. 7 is a diagram showing the relation between the ratio $(Gc-Gs)/Gc$ and temperature increase.
Figure 8:
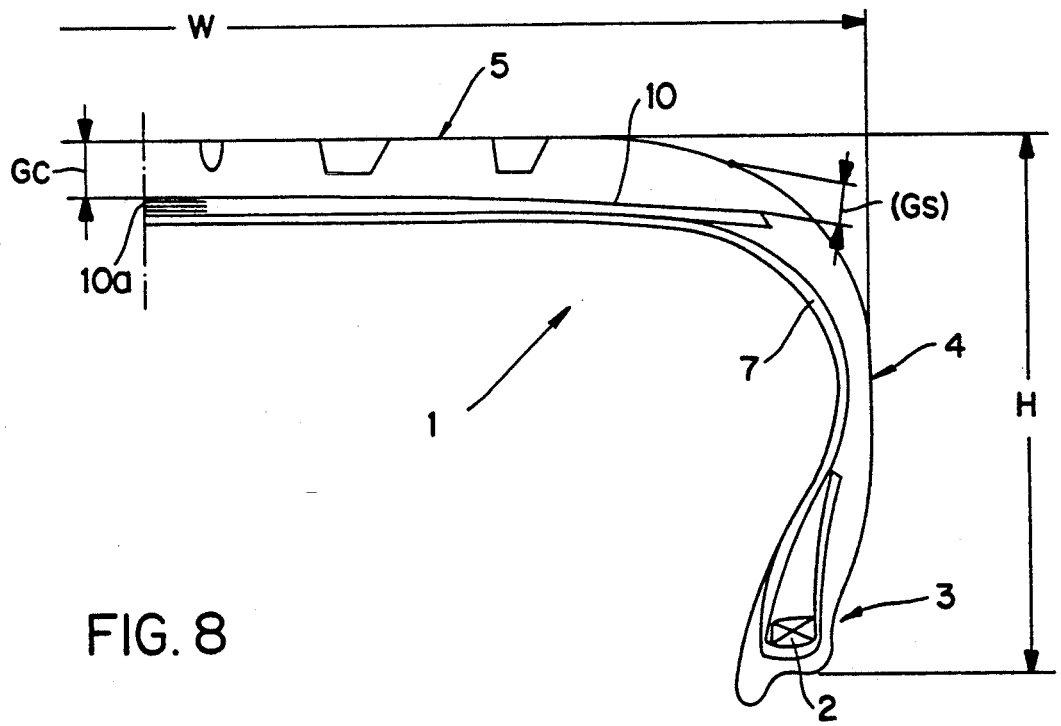
FIG. 8 is a sectional view roughly showing one of the embodiments of the invention.
Figure 9:
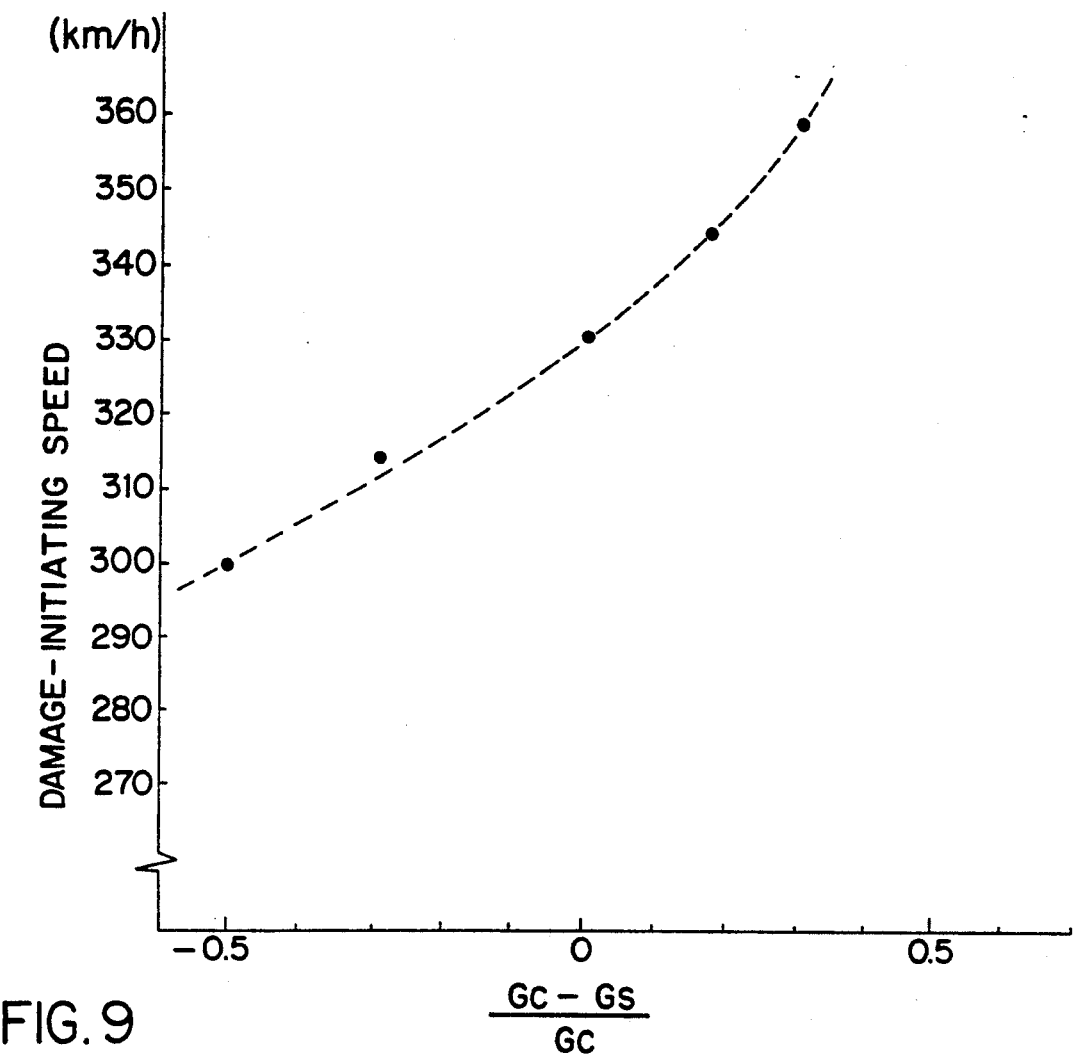
FIG. 9 is a diagram showing the results measured in relation to the ratio $(Gc-Gs)/Gc$ and the damage-initiating speed.
Figure 10:
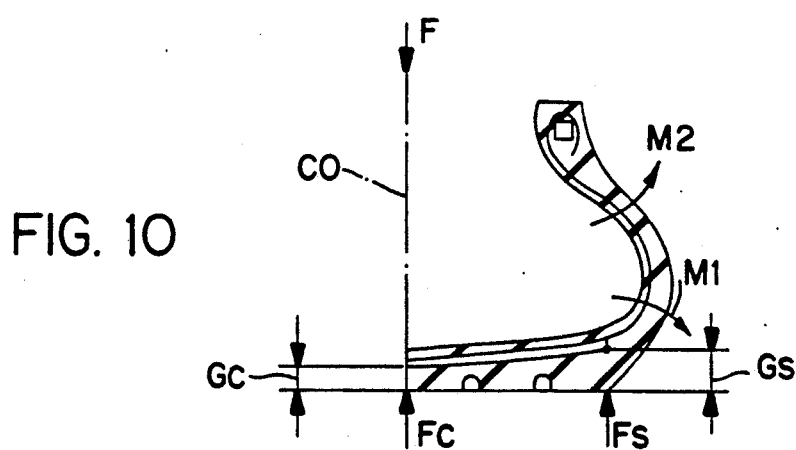
FIG. 10 is a sectional view showing an example of a change in the shape of a tire.

The elastic cord elongates by 5 to 10% upon 5 kgf loading, 9 to 15% upon 10 kgf loading, 28% or less upon breakage, and has an initial elasticity modulus of 130 to 200 kgf/mm$^2$. Such an elastic cord has characteristics within the range enclosed by the curves a and b shown in FIG. 5. The initial elasticity modulus means an elasticity modulus when the elongation is 6 to 7%. In an elastic cord shown by curve a, the load upon breakage, i.e., the strength of the cord is normally about 55 kgf, and in an elastic cord shown by curve b, the strength of the cord is about 40 kgf. As clearly known from the curves a and b, an elastic cord has characteristics that the elongation or extension of the cord is larger with a smaller load, and the elongation change per increased load decreases as the load increases and the elongation upon breakage is set to be 28% or less as described above. It is evident from the above figures that an elastic cord has an elongation of 10 to 11% in a range of 16 to 25% of the strength of the cord. It is obvious that a conventional cord, as shown by curve c, shows larger figures compared with the curve a and forms almost a straight line.

For the elastic cord, a combined cord of one or plural types of nylon cords, polyester cords, aromatic polyamide cords, carbon cords and metallic cords is used.

Moreover, a cord having such material characteristics can be obtained by applying a remarkably less tension upon the dip stretch, which is a prior application of tension and heat to a cord depending on time when using an organic fiber cord, than the tension used in a conventional dip stretch. In order to further improve the characteristics, when using a nylon cord, for example, the number of twists per 10 cm should be 25 to 36 T/10 cm and more preferably, 27 to 35 T/10 cm, which is an increase compared with the conventional number of twists of approximately 23 T/10 cm.

By using such an elastic cord for a carcass cord, it was proved that it was possible to form a tire which priorly elongates carcass cords by 6% or more, and preferably about 8 to 9% when inflated with a specified internal pressure.

As in this embodiment, in the case that the carcass 7 comprises the inner layer 7A and the outer layer 7B, by using an elastic cord having these characteristics, the compression strength of the carcass ply 7$b$ of the outer layer 7B is increased, and for the carcass cord of the inner ply 7$a$, by using a cord which elongates less than

We claim:

1. A high-speed radial tire and rim assembly comprising
   a rim, said rim having at least one radial rim flange; and
   a tire, said tire including
   a carcass having a radial construction composed of at least one ply of carcass cords aligned at an inclination of 70 to 90 degrees against the equator of a tire and fixed by folding over both ends around the bead cores of right and left beads, and
   a belt layer comprised of plural plies of belt cords superposed at an inclination of 0 to 20 degrees against the equator of the tire,
   wherein the thickness ratio $(Gc-Gs)/Gc$, that is, the ratio of the difference between the crown tread thickness $Gc$, which is a thickness of the tread on the equator of the tire, and the shoulder tread thickness $Gs$, which is a thickness of the tread of the ground contact surface at the outer edge in the tire axis direction, at a position where the ground contract surface in the tire axis direction is of the widest width, when mounted on said rim, inflated with a specified internal pressure and loaded with a specified load, $Gc-Gs$, to the crown tread thickness $Gc$ is 0 to 0.3; wherein the ratio $X/H$ of a distance $X$, which is the distance in the tire axis direction from a bead heel point to an inward end in the tire axis direction of the bead core, to the height $H$ of said rim flange, which is a distance in the radial direction from the bead heel point to the radially outer end of said rim flange, is 0.8 to 1.05, and
   wherein an outward end in the radial direction of the bead core is positioned inside the radial direction of the line drawn in the tire axis direction via said outer end of said rim flange, and the ratio $Y/H$ of a distance $Y$ in a the radial direction from said line to said outward end of the bead core to the height $H$ is 0 to 0.3, and
   said carcass is composed of composite elastic cords which elongate by 5 to 10% upon 5 kgf loading and by 9 to 15% upon 10 kgf loading, and have an initial elasticity modulus of 130 to 200 kgf/mm$^2$, said composite elastic cord being made from at least two materials of the group consisting of nylon, polyester, aromatic polyamide, carbon and metal.

* * * * *